United States Patent
Savoie (10) Patent No.: US 8,382,932 B2
(45) Date of Patent: Feb. 26, 2013

(54) METHOD FOR BLOCKING A LENS BLANK, ADHESIVE COMPOSITION AND USE OF THE LATTER IN LENS BLOCKING

(75) Inventor: Marc Savoie, Wetzlar (DE)

(73) Assignee: Satisloh AG, Baar (CH)

( * ) Notice: Subject to any disclaimer, the term of this patent is extended or adjusted under 35 U.S.C. 154(b) by 252 days.

(21) Appl. No.: 12/602,874

(22) PCT Filed: Jun. 28, 2008

(86) PCT No.: PCT/EP2008/005306
§ 371 (c)(1),
(2), (4) Date: Dec. 3, 2009

(87) PCT Pub. No.: WO2009/003660
PCT Pub. Date: Jan. 8, 2009

(65) Prior Publication Data
US 2010/0170635 A1    Jul. 8, 2010

(30) Foreign Application Priority Data
Jul. 5, 2007  (EP) .................................. 07013158

(51) Int. Cl.
  *B29C 65/00* (2006.01)
  *B29B 13/005* (2006.01)
  *B32B 37/12* (2006.01)

(52) U.S. Cl. ................. 156/275.5; 156/272.2; 252/582; 252/589; 451/384

(58) Field of Classification Search ............... 156/275.5, 156/154, 344, 275.7, 330.9, 331.7, 289, 272.2; 451/390, 42, 289, 384; 252/582, 589
See application file for complete search history.

(56) References Cited

U.S. PATENT DOCUMENTS

| | | | |
|---|---|---|---|
| 5,763,075 A * | 6/1998 | Benjamin et al. | 428/349 |
| 5,919,563 A * | 7/1999 | Parish et al. | 428/354 |
| 7,066,797 B2 | 6/2006 | Volken et al. | |
| 2005/0139309 A1 | 6/2005 | Savoie et al. | |

FOREIGN PATENT DOCUMENTS

| WO | WO 94/08788 A1 | 4/1994 |
|---|---|---|
| WO | WO 98/41359 A1 | 9/1998 |

OTHER PUBLICATIONS http://www.sigmaaldrich.com/catalog/ProductDetail.do?D7=0&N5=SEARCH_CONCAT_PNO%7CBRAND_KEY&N4=S5505%7CSIGMA&N25=0&QS=ON&F=SPEC.*
Published DIN Standard No. 58767, Mar. 1998, Entwurf, Jun. 2005, 1 page.
Published DIN Standard No. 58766, Jun. 1997, Blockstuck Durchmesser 43 mm fur Brillenglasfertigung, Mar. 1998, 1 page.
Patent Cooperation Treaty International Search Report, PCT No. PCT/EP2008/005306 dated Oct. 28, 2008, 3 pages.

* cited by examiner

*Primary Examiner* — Richard Crispino
*Assistant Examiner* — Elizabeth Royston
(74) *Attorney, Agent, or Firm* — Reising Ethington P.C.

(57) ABSTRACT

A new lens blocking material (adhesive composition 78) is proposed that essentially overcomes the drawbacks of previous blocking materials. This new material combines traditional UV and/or visible light (VIS) curable polymer materials with specially selected filler (s) as a non polymerizing solid in order to achieve or improve certain desirable material properties, including those of low shrinkage, low exothermic heat of polymerization, and improving the ability to deblock, while simultaneously reducing the high cost associated with such UV/VIS radiation curable materials. The new material is being used in methods for blocking a lens blank (54) onto a lens block (62) with a lens mounting face (64) that has a predetermined block curve, in which the number of different block curves required to cover the full range of standard lenses is minimized.

14 Claims, 8 Drawing Sheets a) 0.5 Base Lens & 0.5 Base Block c) 6 Base Lens & 5 Base Block b) 2 Base Lens & 0.5 Base Block d) 10 Base Lens & 5 Base Block

*FIG. 6* a) 0.5 Base Lens &
5 Base Block b) 2 Base Lens &
5 Base Block c) 6 Base Lens &
5 Base Block d) 10 Base Lens &
5 Base Block

*FIG. 7* a) 0.5 Base Lens &
0.5 Base Block b) 2 Base Lens &
0.5 Base Block c) 6 Base Lens &
5 Base Block d) 10 Base Lens &
5 Base Block

*FIG. 8*

FIG. 10
PRIOR ART a) 0.5 Base b) 2 Base c) 6 Base d) 10 Base

METHOD FOR BLOCKING A LENS BLANK, ADHESIVE COMPOSITION AND USE OF THE LATTER IN LENS BLOCKING

TECHNICAL FIELD OF THE INVENTION

The present invention generally relates to the bonding of an ophthalmic lens blank to a lens support block ("lens block") for supporting the lens blank during a lens generating process, as applied in prescription workshops in masses, that is to say production workshops for manufacturing individual spectacle lenses from customary materials (polycarbonate, mineral glass, CR 39, HI index, etc.) according to a prescription.

More particularly the present invention relates to a method for blocking a lens blank, the use in lens blocking of an adhesive composition and the adhesive composition itself, wherein a radiation cured material is being used in each case as a bonding agent. A "radiation cured material" in the context of the present application refers to liquid chemical resin compounds chemically sensitive to certain electromagnetic radiation wavelengths which will cause the resin to cure, i.e. polymerize to become a solid when the material is irradiated with these "photo active" waves. In other words the material will phase change from liquid to solid upon being exposed to the electromagnetic radiation in question, in particular light in the ultraviolet ("UV") and high visible spectrum ("VIS").

BACKGROUND OF THE INVENTION AND PRIOR ART

An ophthalmic lens blank generally has a first face with a pre-determined curvature and a second face, opposite the first face on which a desired surface contour is generated by a machining process. The overall process is generally referred to as "lens surfacing" and the overall object is to yield a finished spectacle lens wherein the first and second face curvatures cooperate to yield desired optical properties.

In prescription workshops, the following main process steps are usually carried out: Firstly, a suitable right and/or left ophthalmic lens blank is removed from a semifinished product store. The term "semifinished" is used to mean that the ophthalmic lens blanks, which are usually round or oval in plan view and have not yet been edged, have already been machined or in another way contoured on one of their two optically active faces. The ophthalmic lens blanks are then prepared for the blocking operation, namely by applying a suitable protective film or a suitable protective lacquer to protect the optically active face which has already been machined or contoured, i.e. the first face or blocking face.

The so-called "blocking" of the ophthalmic lens blanks then takes place. During this, the ophthalmic lens blank is joined to a suitable lens block, for example a lens block according to German standard DIN 58766. To this end, the lens block is firstly brought into a predefined position with respect to the protected first face of the ophthalmic lens blank, and then in this position the space between lens block and ophthalmic lens blank is filled with a molten material (normally a metal alloy or wax). Once this material has solidified, the lens block forms a holder or support for machining the second face of the ophthalmic lens blank. The lens block is grasped by chuck or other suitable coupling means during lens generation to provide in particular secure mounting to the profiling machine while avoiding damage to the lens.

Lens surfacing is carried out then using profiling machines which typically have a cutter of some type that is moved across the second face of the ophthalmic lens blank to give the second face its macrogeometry according to the prescription. The lens blank may be stationary or rotating during the cutting operation, depending on the particular profiling machine which is being used. Typical machining processes for surfacing ophthalmic lenses include single point diamond turning, diamond tool fly-cutting, milling, and grinding processes, applied depending on the lens material.

Usually fine machining of the ophthalmic lenses then takes place, in which the pre-machined second face of the respective ophthalmic lens blank is given the desired microgeometry. Depending on inter alia the material of the ophthalmic lenses, the fine machining process is divided into a fine grinding operation and a subsequent polishing operation, or includes only a polishing operation if a polishable second face has already been produced during the pre-machining stage.

Only after the polishing operation is the ophthalmic lens separated from the lens block ("deblocking") before cleaning steps and possibly further refining steps are carried out, e.g. anti-reflection coating or hard coating of the ophthalmic lenses. The lens block accordingly remains on the ophthalmic lens (at least) for a number of machining operations and must remain reliably thereon during said operations.

Recently other bonding materials have been proposed for lens blocking in order to overcome certain disadvantages—the long time required for setting before the blocked lens can be safely released to subsequent processing operations, distortion problems with the lens caused by the heat associated with the molten material, and possible contamination of the lens, just to name a few—carried by the use of metal alloy or wax as the classical bonding agent. These other bonding materials include radiation curable materials.

In this connection document US 2005/0139309 A discusses the use of a UV light curable blocking material designed to reduce polymerization induced shrinkage. Although this development has been a significant step forward in allowing the use of UV curable materials for use in lens blocking, it still exhibits shrinkage of the order of 3%. This amount of shrinkage is generally not serious when the UV curable adhesive is used in a relatively thin (typically less than 3 mm) and uniform thickness; however it has serious limitations when thicker sections of adhesive are needed.

The shrinkage problem becomes even more apparent when blocking lenses having strongly non-uniform cross sections so that non-uniform sections of adhesive are needed. An example of this can be seen in FIG. 10 which shows a flat top bifocal lens blank 10 having a step discontinuity 12 between a bifocal segment 14 and a base curve 16, blocked on a lens block 18 by means of an UV cured adhesive 20. As is evident from FIG. 10 shrinkage can be a problem when the gap 22 between the bifocal segment 14 and the lens block 18 is significantly different than the gap 24 directly above the bifocal segment 14. In this instance the difference in shrinkage caused by the difference in thickness of the UV cured adhesive 20 can cause critical/unwanted distortion directly above the bifocal segment 14.

Figure 11:
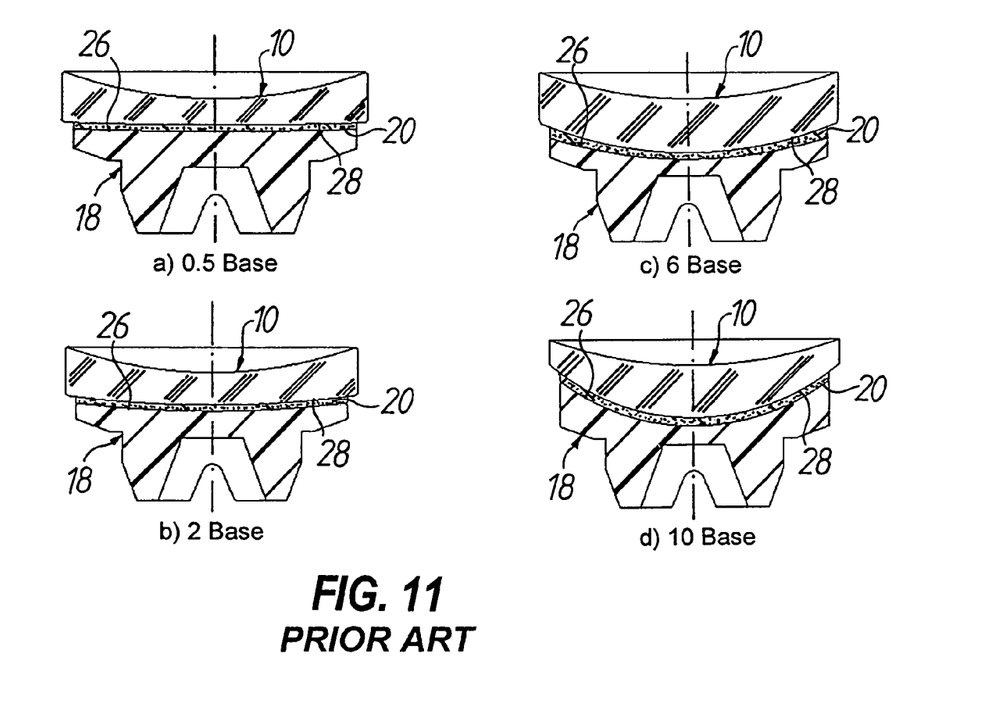
FIG. 11 shows, by way of sectional views, four lens blanks each having a blocking face of different pre-determined curvature, that were blocked using a conventional method, in which a plurality of different lens blocks is utilized that have different block curves each closely matching the blocking face curvature of the assigned lens blank.

In an attempt to overcome the shrinkage problems remaining with the above UV light curable blocking material it has been proposed to use numerous (7 or 8) different block base curves to approximately match the conceivable lens base curves, and thereby keep the adhesive thickness sufficiently uniform to minimize residual shrinkage effects. FIG. 11 illustrates the prior art using numerous lens blocks 18 each comprising a lens mounting face 26 that has a pre-determined block curve, wherein the block curves of different lens blocks 18 differ from each other. In the example shown the lens blocks 18 comprise essentially spherical lens mounting faces 26 that have block curves of a) 0.5 diopters, b) 2 diopters, c) 6 diopters, and d) 10 diopters, respectively, generally matching the lens curves, i.e. the respective curvature of the blocking faces 28 of the blocked lens blanks 10. It is to be noted that only four different lens blocks 18 are shown in FIG. 11 to simplify the illustration; actually however this system used seven or eight different lens blocks, as mentioned before. As becomes apparent from FIG. 11 the UV cured adhesive 20 between lens blank 10 and lens block 18 in each case has a relatively thin and substantially uniform thickness so that there is no critical distortion due to shrinkage of the UV cured adhesive 20.

Figure 10:
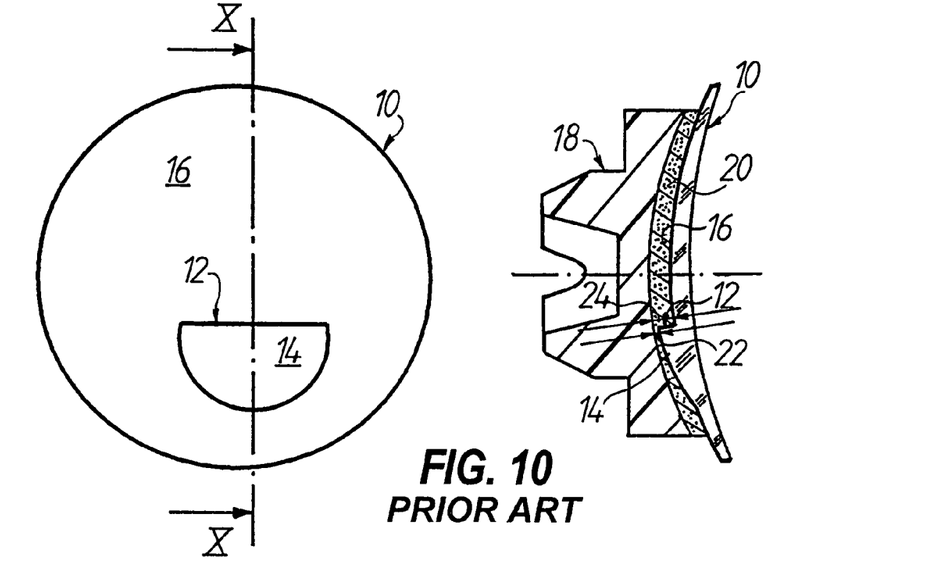
FIG. 10 shows, by way of a plan view and a sectional view on line X-X, respectively, an ophthalmic lens blank comprising a bifocal segment (left side) that is blocked on a lens block (right side) in a conventional manner.

However the approach of using numerous different block base curves does not help in the situation shown in FIG. 10. A further problem associated with multiple block base curves is the management of these numerous curves. The proper lens blocks initially need to be selected to match the lens curves, then, after deblocking, (assuming the lens blocks are reused), they need to be properly sorted according to curve, and stored in separate holding/dispensing containers. Using multiple block curves thus adds to the complexity of the manufacturing process, increases the probability of error, and as a result increases the cost of lens manufacturing.

OBJECT OF THE INVENTION

The object of the present invention is to provide a method for blocking a lens blank in which the number of block curves required to cover the full range of standard lenses is minimized, and which also addresses the problems associated with shrinkage of a radiation cured material as the bonding agent. The object of the invention further encompasses the provision of an adhesive composition for lens blocking that can be cured by radiation and serves the above purpose.

SUMMARY OF THE INVENTION

According to one aspect of the present invention there is provided a method for blocking a lens blank having a blocking face of pre-determined curvature, which method comprises the steps of:
 (a) providing a plurality of lens blocks each comprising a lens mounting face that has a pre-determined block curve, wherein said lens blocks all have the same block curve;
 (b) taking out one of said lens blocks of said plurality of lens blocks;
 (c) mixing an adhesive composition comprising in an un-polymerized state a liquid adhesive curable by UV or visible light and a filler as a non polymerizing solid;
 (d) applying to at least one of said blocking face of said lens blank and said lens mounting face of said lens block said adhesive composition;
 (e) urging said lens blank toward said lens block with said blocking face of said lens blank facing said lens mounting face of said lens block; and
 (f) generating UV or visible light and transmitting the light to said adhesive composition, said light being of a wavelength and an intensity and applied for a time interval sufficient to cause setting of said adhesive composition;
 (g) wherein a mixing ratio of said adhesive and said filler is selected to have a dimensional change and exothermic heat of polymerization of said adhesive composition upon setting low enough so that the adhesive composition is capable of setting without imparting undue stresses on said lens blank and without de-bonding of said lens blank from said adhesive composition.

According to a further aspect of the present invention there is provided a method for blocking a lens blank having a blocking face of pre-determined curvature, which method comprises the steps of:
 (a) providing a plurality of lens blocks each comprising a lens mounting face that has a pre-determined block curve, wherein said lens blocks have a few different block curves only;
 (b) selecting a lens block having a specific block curve depending on said curvature of said blocking face of said lens blank so that said block curve matches said curvature of said blocking face as best as possible;
 (c) mixing an adhesive composition comprising in an un-polymerized state a liquid adhesive curable by UV or visible light and a filler as a non polymerizing solid;
 (d) applying to at least one of said blocking face of said lens blank and said lens mounting face of said lens block said adhesive composition;
 (e) urging said lens blank toward said lens block with said blocking face of said lens blank facing said lens mounting face of said lens block; and
 (f) generating UV or visible light and transmitting the light to said adhesive composition, said light being of a wavelength and an intensity and applied for a time interval sufficient to cause setting of said adhesive composition;
 (g) wherein a mixing ratio of said adhesive and said filler is selected to have a dimensional change and exothermic heat of polymerization of said adhesive composition upon setting low enough so that the adhesive composition is capable of setting without imparting undue stresses on said lens blank and without de-bonding of said lens blank from said adhesive composition.

First of all, as compared to the above prior art, both methods have in common a reduction of the number of block curves. Whereas the first of the above methods in which only one block curve is being used represents the ideal situation, even using a few different block curves according to the second method, e.g. 2 or 3 block curves, is felt to be significantly better than using 7 or 8 block curves in terms of decreasing the complexity of the manufacturing process, the probability of error, and the cost of lens manufacturing.

Further, as compared to the above prior art again, the methods according to the present invention have in common the use in lens blocking of an adhesive composition comprising in an un-polymerized state a liquid adhesive curable by UV or visible light and a filler as a non polymerizing solid, wherein in particular the mixing ratio of the adhesive and the filler is selected to have a dimensional change and exothermic heat of polymerization of the adhesive composition upon setting low enough so that the adhesive composition is capable of setting without imparting undue stresses on the lens blank and without de-bonding of the lens blank from the adhesive composition.

In this connection the use of the filler offers several advantages. Since a significant portion of the shrinkage comes from material structural changes during polymerization, one can physically introduce the filler as a non polymerizing solid into the liquid (un-polymerized) compound, and thereby reduce shrinkage by at least the volume percentage of filler material introduced.

Further, typical UV or light radiation cured materials, although they are considered relatively "low ° T" curing, exhibit a certain level of exothermic heat during the curing process. In some cases, and especially when the volume of UV/VIS material is high, this exothermic reaction can raise the temperature of the material 20 to 40° C. above the initial liquid temperature. These higher process temperatures in turn could cause thermal stresses in the lens blank due to different CTEs (Coefficients of Thermal Expansion) between lens blank, lens block, and adhesive. Therefore, in addition to reducing the shrinkage coming from polymerization, the reduction in volume of UV/VIS curable material by the introduction of filler in turn reduces the exothermic component of the curing reaction, thereby resulting in a lower final process temperature, and lower thermal expansion.

The combined effect of reducing both sources of shrinkage (structural changes during polymerization and exothermic heat of polymerization) simultaneously is seen to be very beneficial to the ability to successfully block lenses using non-constant UV/VIS material thicknesses, as is the case inevitably when one or a few block curves only are being used for blocking the full range of standard lenses.

A further important benefit to using filler is that of cost reduction by reducing the amount of UV/VIS curable material. The UV/VIS curable materials use relatively expensive chemical components—in particular the photoinitiators used to initiate electromagnetic radiation (UV/VIS) curing tend to be very expensive—and as such result in relatively high costs of blocking compound. In addition to this, once cured the compound cannot be returned to its liquid (un-polymerized) state. This means that it cannot be recycled by re-melting in a way similar to wood metal or blocking wax (or other thermoplastics such as e-Caprolactone and its derivative Polycaprolactone).

In the first of the above methods, i.e. in the case in which lens blocks are provided that all have one and the same block curve, the lens blocks preferably all have an essentially spherical lens mounting face comprising the same block curve selected in accordance with a distribution of the blocking face curvature of lens blanks to be blocked for a given population. This takes into account advantageously that different populations may present different distributions, and therefore require different block curves to minimize material usage. For example certain Asian populations are known to skew more to the lower (flatter) base curves when compared to Western European or North American populations. This would result in the selection of a slightly lower block curve in order to better optimize (minimize) material usage, and/or final optical performance.

In the second of the above methods, i.e. in the case in which lens blocks are provided that have a few different block curves only, preferably the lens blocks all have an essentially spherical lens mounting face, wherein lens blocks of two different block curves are provided, namely lens blocks comprising a concave block curve within the range of 0 to 4 diopters, and lens blocks comprising a concave block curve within the range of 4 to 8 diopters. Depending on the geometry of the blocking faces of the lens blanks to be blocked however the block curves could also be convex.

In one preferred embodiment of the second method, the step of selecting a lens block is carried out to the effect that, in the blocked state of the lens blank, a gap between the lens mounting face of the lens block and the blocking face of the lens blank is minimized in a central region of the lens block. As a result the absolute shrinkage of the adhesive composition is (even more) minimized at center so that very small stresses if any are induced in the blocked lens blank, especially in the vicinity of the MRP (major reference point).

In principle, lens blocks may be used that are opaque or even impervious to light of all kind, wherein the UV or visible light is transmitted to the adhesive composition through the lens blank to cause setting of the adhesive composition. However, preference is given to the use of lens blocks that are capable of transmitting UV or visible light, wherein the step of generating UV or visible light and transmitting the light to the adhesive composition in all methods preferably includes then transmitting the light to the adhesive composition through the lens block.

According to the present invention an adhesive composition for use in lens blocking is also provided. The adhesive composition comprises (a) an adhesive curable by UV or visible light that is liquid in an un-polymerized state, and (b) a filler as a non polymerizing solid, wherein the mixing ratio of the adhesive and the filler is in a range between 70% by weight adhesive versus 30% by weight filler and 30% by weight adhesive versus 70% by weight filler. As tests have shown, a mixing ratio within this range is effective to cause a dimensional change and exothermic heat of polymerization of the adhesive composition upon setting low enough so that the adhesive composition is capable of setting without imparting undue stresses on the lens blank and without debonding of the lens blank from the adhesive composition. The adhesive composition including the filler, when used in lens blocking, also leads to cost reduction as compared to the use of conventional radiation cured blocking material, as already explained above. Again, such adhesive composition finally represents a "vehicle" for the reduction of the number of block curves required in lens generation to cover the full range of standard lenses (cf. the above explanations).

Preferably the filler consists of solid particles that provide for sufficient rigidity of the cured adhesive composition to prevent full or partial flexing and movement of the blocked lens.

The preferred filler particle geometry is generally spherical however cylindrical or irregular geometries can also work well. The advantage to the spherical geometry is one of improved (lower) viscosity in the liquid state of the adhesive composition.

The filler particle sizes generally need to be smaller than the minimum gap between the lens blank to be blocked and the designated lens block. Minimum gaps of 2 mm are currently preferred so this means the largest particles should be smaller than 2 mm, and preferably equal to or less than 1 mm.

To facilitate deblocking it is preferred for the filler to contain a small amount of metal fibers, granules, or powder, preferably aluminum fibers in a quantity of 1 to 2% by weight of the composition in total. Such quantity of fibers provides sufficient absorption of microwave energy to significantly accelerate heating of the cured blocking material by microwave energy whereby the blocking material can be "softened" prior to deblocking.

Preferably the filler material is transparent and/or translucent to photo active wavelengths of UV and/or visible light in order to accelerate curing of the adhesive composition.

The filler material may further have low moisture absorption properties which is of importance if and when a complete blocked lens is introduced into a vacuum chamber typically used in thin film coating processes.

Continuing the concept of the invention, the filler material may have a Glass Transition Temperature (Tg) between 25° and 80° C. By using such filler material certain mechanical properties—sufficient stiffness and hardness for instance—can be achieved at surfacing process temperatures (typically close to room temperature), which can then be changed by raising the temperature above Tg in order to facilitate deblocking. In this connection the upper limit of 80° C. assures that, to facilitate deblocking, there is no need to raise the temperature of the cured blocking material above temperatures that could permanently damage a surfaced lens.

It is finally preferred for the filler material to be selected from a group comprising the UV or visible light cured adhesive in a reground state, and plastic materials including e-Caprolactone and its derivative Polycaprolactone, Terpolymer derived from Ethyl-Methyl-Acrylate-Acrylic Acid, Polycarbonate, Polyethylene (PET), High Methacrylate Resin, Ethyl Methacrylate Resin, Methacrylate Copolymer Resin, Butyl Methacrylate Resin, and Methyl/n-Butyl Methacrylate Copolymer Resin. Among other things the respective advantages of such filler materials will become apparent from the following description of the preferred embodiments of the invention.

BRIEF DESCRIPTION OF THE DRAWINGS

Hereinbelow, the invention will be explained in more detail on the basis of preferred examples of embodiment and with reference to the appended, partially schematic drawings. In the drawings.

DETAILED DESCRIPTION OF PREFERRED EMBODIMENTS OF THE INVENTION

An apparatus for blocking an ophthalmic lens is generally indicated by reference 30 in the accompanying illustrations. The blocking apparatus 30 includes a cabinet having a top 32 and a hood structure 34 for partially enclosing the top 32. A lens transporter 36 is moveably mounted on a first linear actuator 38 affixed to the top 32. The first linear actuator 38 has a first servo motor or stepper motor unit for moving the lens transporter 36 therealong and for monitoring its position.

Figure 1:
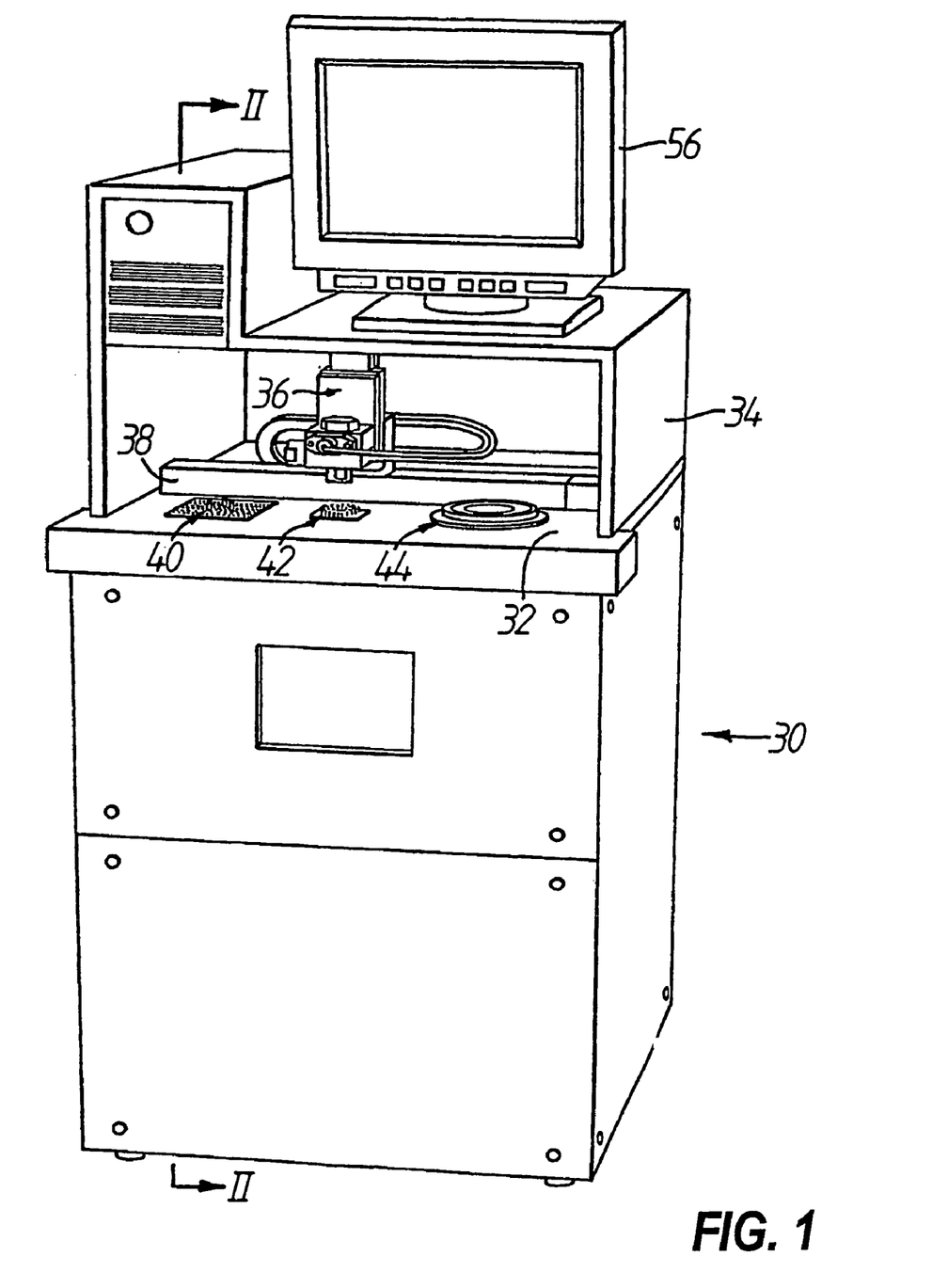
FIG. 1 is a perspective view of an ophthalmic lens blocking apparatus that may be utilized in the blocking methods according to the present invention.
Figure 2:
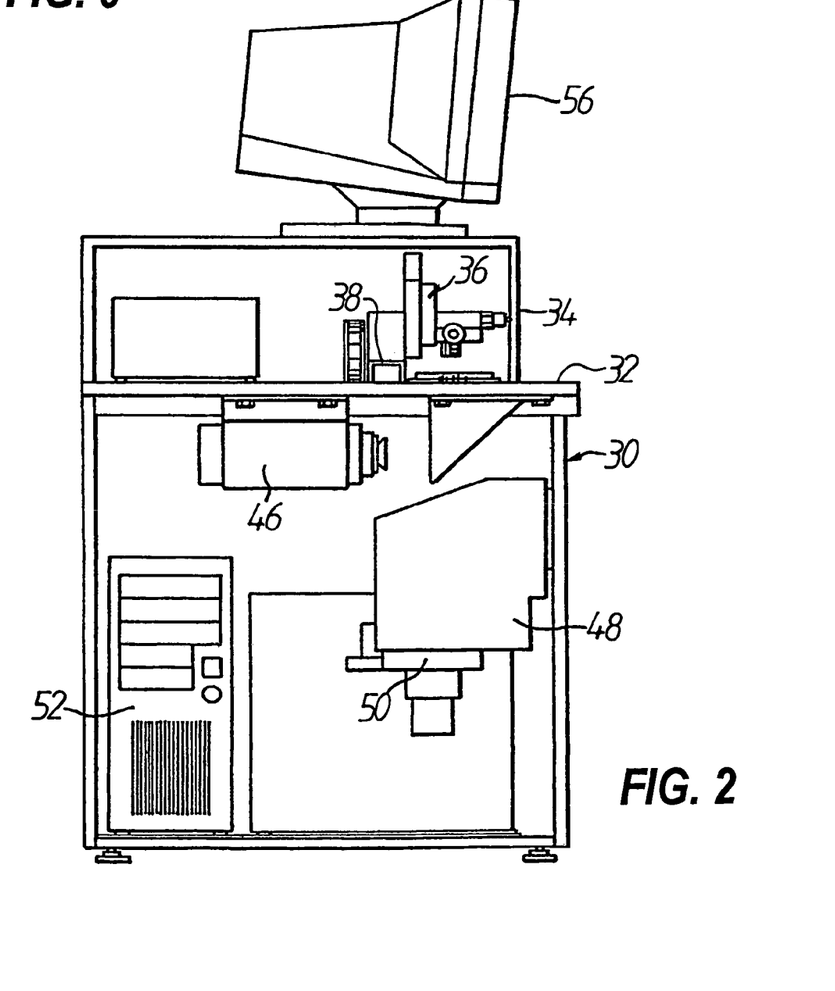
FIG. 2 is a section on line II-II of FIG. 1.
Figure 3:
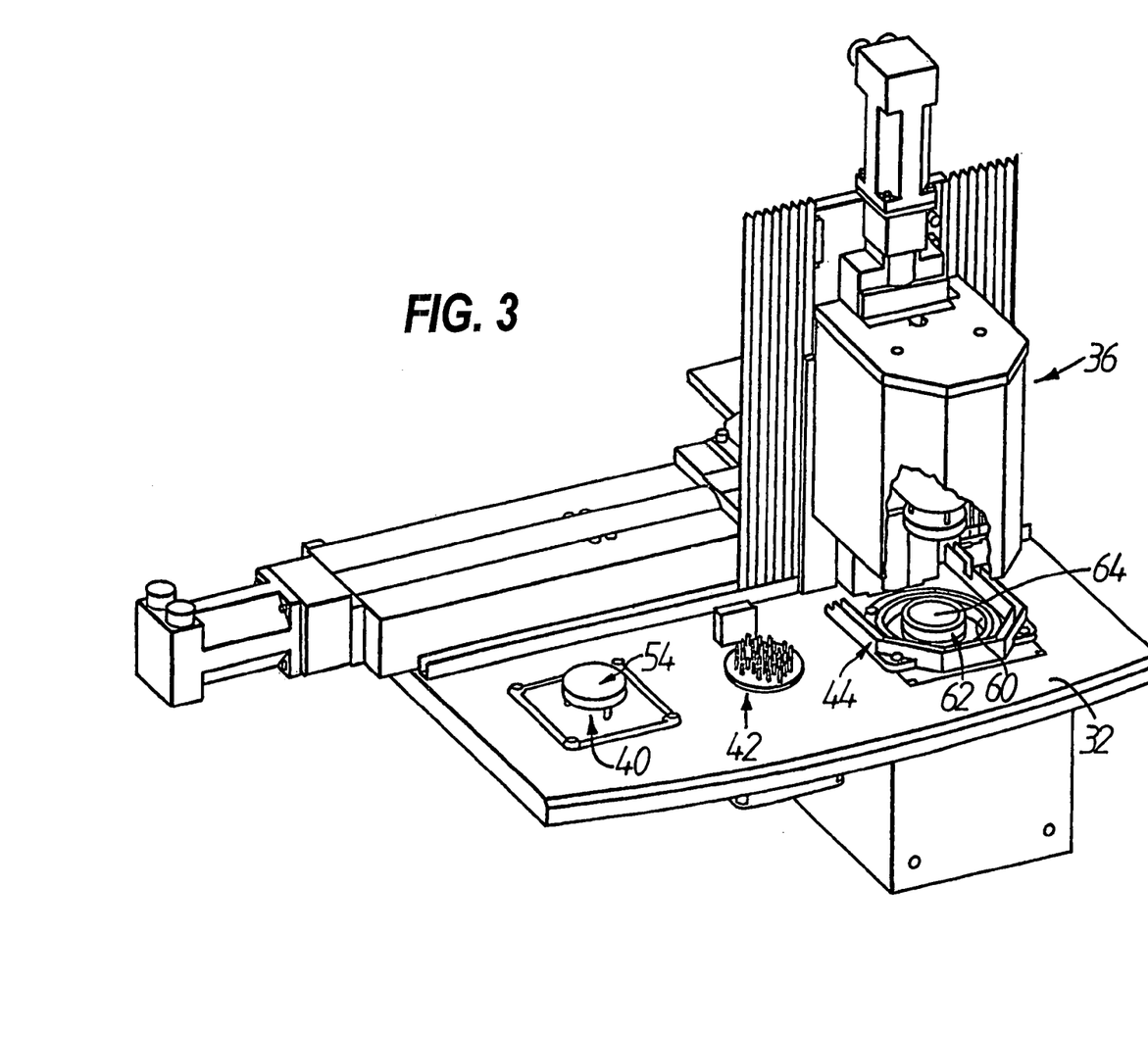
FIG. 3 is a partially cut away perspective view illustrating a lens blank being held over a lens block by a lens transporter.

The blocking apparatus 30 has, aligned with the first linear actuator 38 and incorporated into the top 32 of the cabinet, an imaging station 40, a probing station 42 and a lens blocking station 44. The blocking apparatus 30 encloses (cf. FIG. 2) a camera 46 focused on the imaging station 40, an adhesive composition reservoir 48 and a pumping unit 50 for pumping the adhesive composition to the lens blocking station 44. The blocking apparatus 30 further includes a controller in the form of a central processing unit 52 for controlling its operation.

The imaging station 40 is utilized for lens orientation to ensure that a lens blank 54 is properly aligned and oriented at the outset of the lens blocking process, with the aid of a screen 56 for displaying lens orientation information generated by the central processing unit 52 on the basis of image information received from the camera 46. As to further structural and functional details of the imaging station 40 reference is made to document US 2005/0139309 A.

Once orientation and positional parameters of the lens blank 54 have been determined, the lens blank 54 is transported by the lens transporter 36 from the imaging station 40 to the probing station 42 for probing the blocking face 58 of the lens blank 54. Again, further details as regards structure and function of the lens transporter 36 and the probing station 42 can be taken from document US 2005/0139309 A.

Once the blocking face 58 of the lens blank 54 has been probed, the lens blank 54 is transported by the lens transporter 36 from the probing station 42 to the lens blocking station 44. The lens blocking station 44 includes a UV and visible light transmissive lens block support 60 for receiving and supporting a lens block 62 with a lens mounting face 64 of the lens block 62 facing upwardly. In this instance the lens block 62 should be of a transparent material capable of transmitting at least light in the UV spectrum and preferably also in the visible spectrum. As to further structural and functional features of the lens block 62, in particular the clamping portion of the lens block 62 via which the lens block 62 can be held in the lens blocking station 44 and later fixed on a spindle of a surfacing machine (not shown), reference is made to document US 2005/0250430 A.

Figure 6:
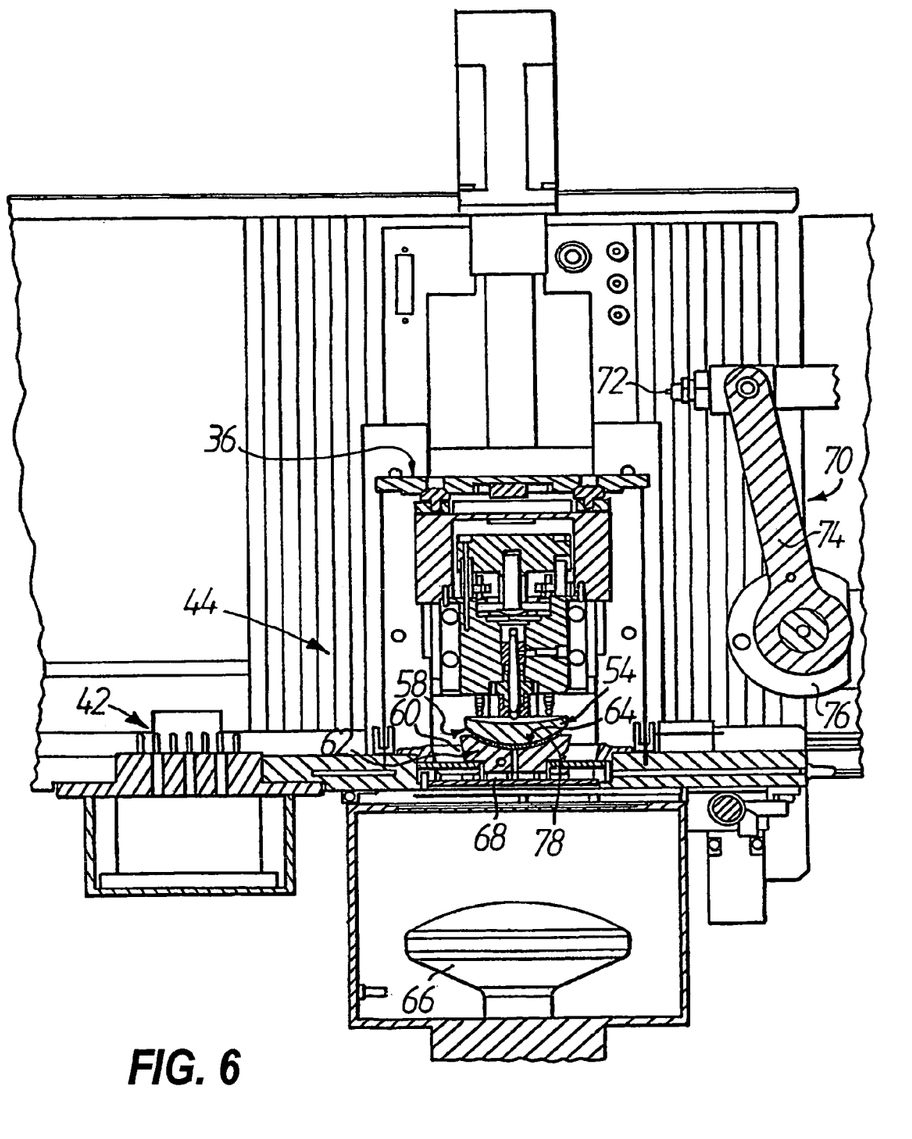
FIG. 6 is a sectional view on line VI-VI of FIG. 4.

A UV light source 66 (see FIG. 6) is associated with the lens block support 60 in that it is mounted so as to direct light through an aperture 68 in the lens block support 60 which in turn directs the UV light through the UV transmissive lens block 62. A light source actuator which may form part of the central processing unit 52 is connected to the UV light source 66 to control activation and de-activation of the UV light source 66. The UV light source 66 could incorporate a flash lamp which emits a pulse of high intensity short duration light within the UV spectrum and in the visible spectrum.

Figure 4:
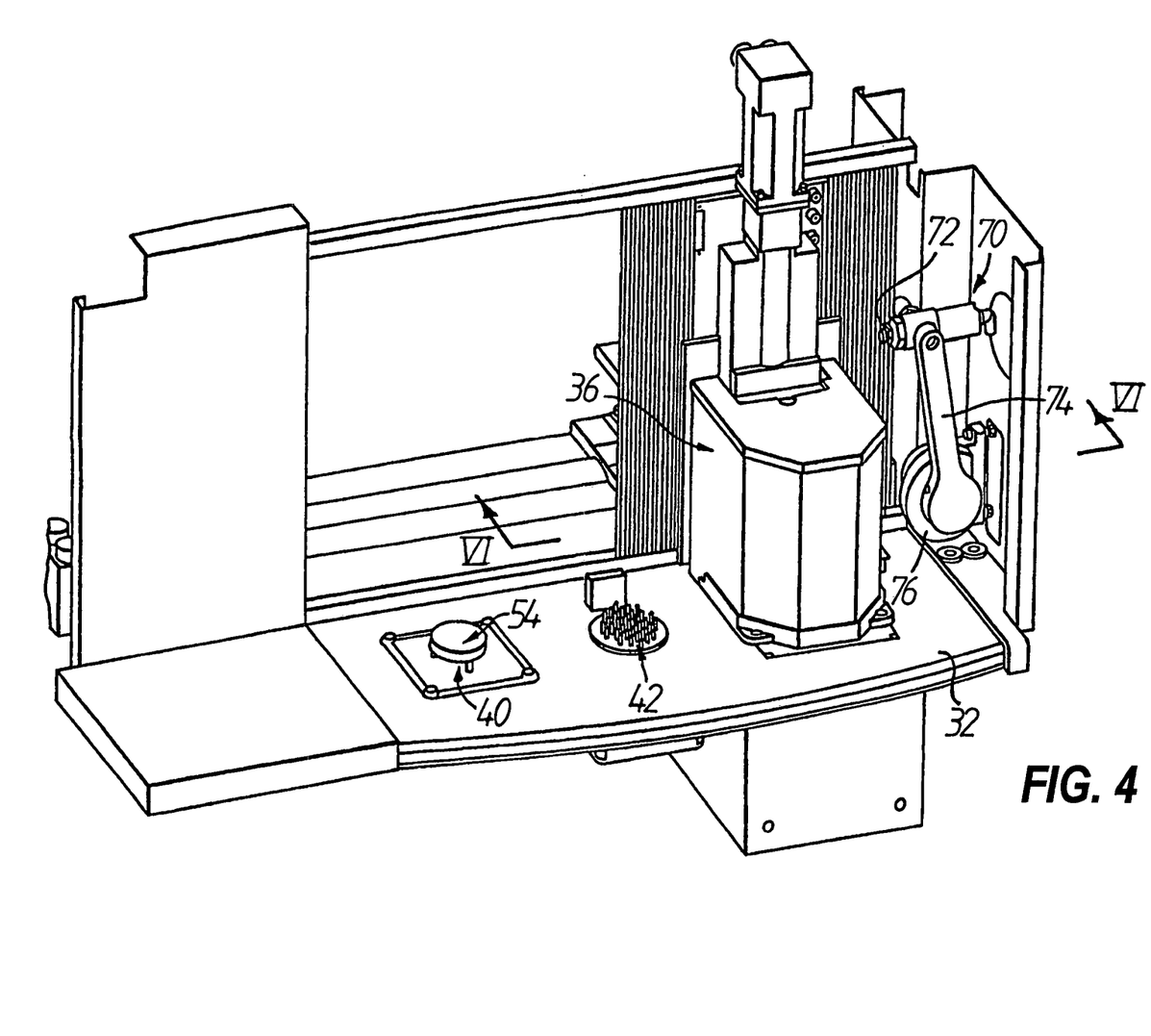
FIG. 4 is a partially cut away perspective view illustrating lens blank placement on a lens block and also illustrating an adhesive composition dispenser in a retracted position.
Figure 5:
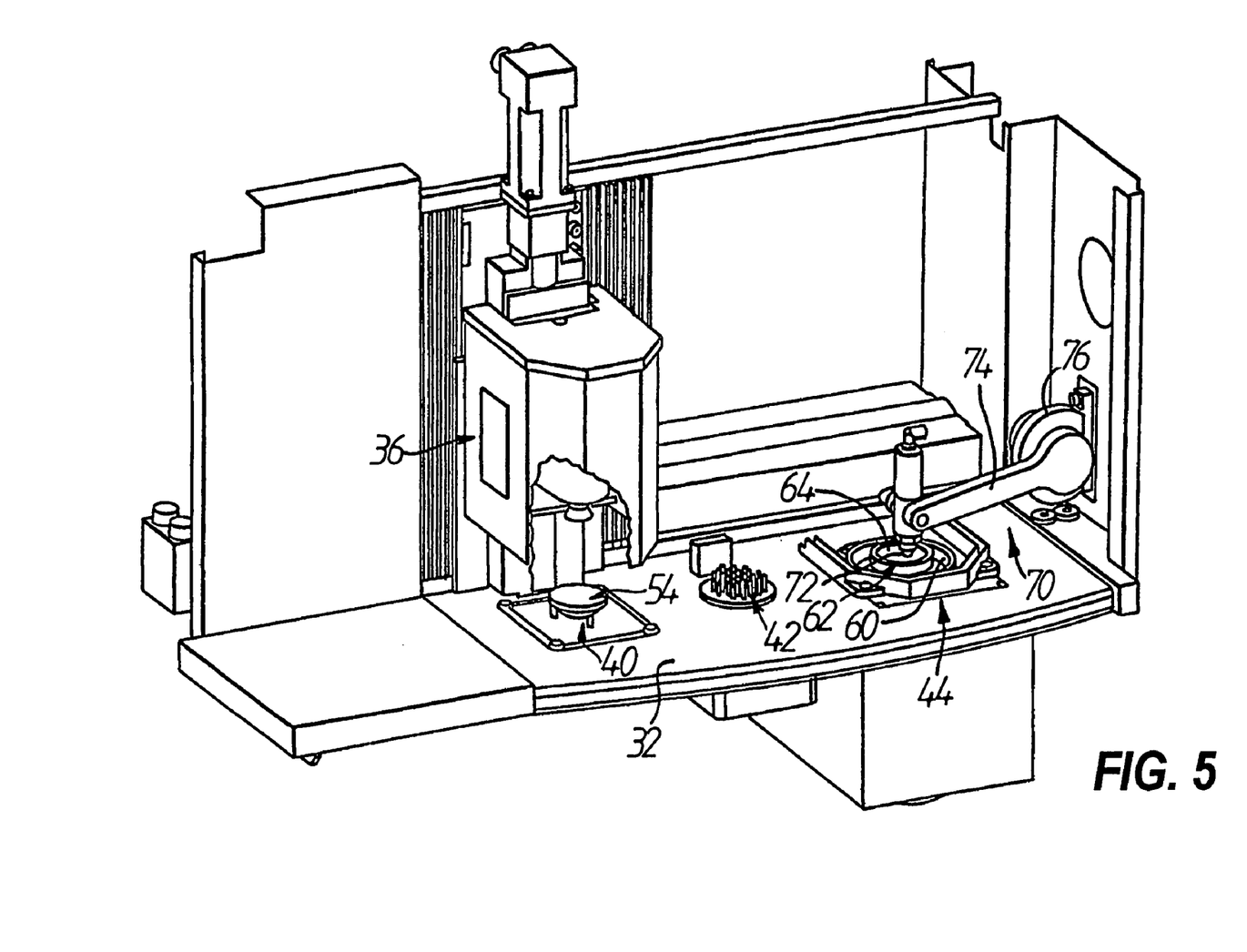
FIG. 5 is a partially cut away perspective view illustrating a lens transporter before picking up a lens blank and illustrating an adhesive composition dispenser in its deployed position.

A dispenser for dispensing an adhesive composition curable by UV/visible light is generally indicated by reference 70. The dispenser 70 has a dispenser nozzle 72 at one end of a dispenser arm 74. An arm actuator—which may be a motor such as illustrated by reference 76 or a linear or other actuator—may be provided to move the dispenser arm 74 from a deployed position adjacent the lens mounting face 64 (FIG. 5) to a retracted position clear of the lens mounting face 64 (FIG. 4) and the lens transporter 36 (and vice versa) so as not to interfere with the placement of the lens blank 54 over the lens mounting face 64 of the lens block 62.

The dispenser arm 74 merely controls position of the dispenser nozzle 72. Accordingly the dispenser arm 74 can be telescopic rather than rotatable as illustrated and possibly controlled by a linear actuator such as a fluid pressure actuated piston within a cylinder.

The dispenser nozzle 72 fluidly communicates with the adhesive composition reservoir 48 through the pumping unit 50 which supplies the adhesive composition to the dispenser nozzle 72. Alternatively, the adhesive composition reservoir 48 may be pressurized thereby obviating the need for a pump.

It should be noted here that in the embodiment shown the adhesive composition reservoir 48 as a—preferably replaceable—pre-filled unit already contains the ready-mixed adhesive composition comprised of an un-polymerized, i.e. liquid UV/VIS curable adhesive and a suitable filler as a non polymerizing solid. As an alternative to this however the blocking apparatus may be equipped with a mixing unit for preparing the adhesive composition from the above components that could be stored in appropriate containers replaceably mounted to the blocking apparatus 30.

The dispenser nozzle 72 is equipped with a valve or other shut-off mechanism which communicates with the central processing unit 52 to control dispensing of the adhesive composition through the dispenser nozzle 72 when the dispenser nozzle 72 is in the deployed position. Different control arrangements may be used. A simple form of control is to monitor the time that the dispenser nozzle 72 is held open. Other controls such as a metering pump may be utilized. Generally whatever control is selected should dispense a measured amount of adhesive composition which will substantially fill the gap between the blocking face 58 of the lens blank 54 and the lens mounting face 64 of the lens block 62.

In use, a measured amount of UV/VIS curable adhesive composition is dispensed via the dispenser nozzle 72 of the dispenser 70 on the lens mounting face 64 of the lens block 62. The lens blank 54 is moved by means of the lens transporter 36 over the lens block 62 with the blocking face 58 of the lens blank 54 facing the lens mounting face 64. The lens transporter 36 then moves the lens blank 54 toward to the lens mounting face 64 and into the liquid adhesive composition 78 (see FIG. 6) until the blocking face 58 of the lens blank 54 is a predetermined distance from the lens mounting face 64 of the lens block 62.

Because the geometry and spatial relationships between the blocking face 58 and the lens mounting face 64 are known, the amount of adhesive composition 78 required can be calculated and dispensed automatically without operator intervention.

At this stage, UV light is generated by the UV light source 66 and transmitted through the lens block 62 at a wavelength, and intensity and for a duration sufficient to cause the adhesive composition 78 to cure thereby bonding the lens blank 54 to the lens block 62.

As a final step, the lens block 62 with the lens blank 54 attached thereto would be removed from the lens blocking station 44 and released from the lens transporter 36.

Figure 7:
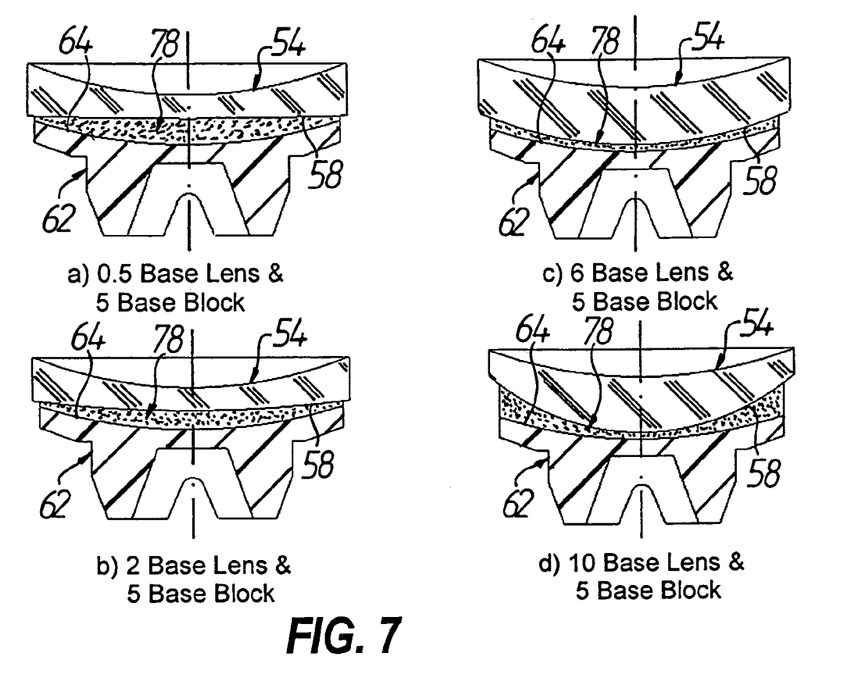
FIG. 7 shows, by way of sectional views, four lens blanks each having a blocking face of different pre-determined curvature, that were blocked using a first method according to the invention in which identical lens blocks and an adhesive composition comprising in an un-polymerized state a liquid UV/VIS curable adhesive and a filler as a non polymerizing solid are utilized.

FIG. 7 illustrates blocking results obtained by a blocking process that comprises the following steps:
  (a) providing a plurality of lens blocks 62 each comprising a lens mounting face 64 that has a pre-determined block curve, wherein the lens blocks 62 all have the same block curve—in the example shown the lens blocks 62 all have an essentially spherical lens mounting face 64 with a block curve of 5 diopters;
  (b) taking out one of the lens blocks 62 of the plurality of lens blocks 62—in a prescription workshop the lens blocks 62 usually are stored in a holding/dispensing container from which individual lens blocks 62 can be taken out; in this instance no selection is necessary since the lens blocks 62 are identical;
  (c) mixing an adhesive composition 78 comprising in an un-polymerized state a liquid UV/VIS curable adhesive and a filler as a non polymerizing solid, wherein a mixing ratio of the adhesive and the filler is selected to have a dimensional change and exothermic heat of polymerization of the adhesive composition 78 upon setting low enough so that the adhesive composition 78 is capable of setting without imparting undue stresses on the lens blank 54 and without de-bonding of the lens blank 54 from the adhesive composition 78—as indicated earlier such mixing may take place shortly before dispensing the adhesive composition 78 for blocking purposes, possibly even in the blocking apparatus 30, or as an alternative to this at an earlier time, perhaps outside the prescription workshop already;
  (d) applying to preferably the lens mounting face 64 of the lens block 62 the liquid adhesive composition 78;
  (e) urging the lens blank 54 toward the lens block 62—or vice versa or both; obviously the relative movement between lens blank 54 and lens block 62 is important—with the blocking face 58 of the lens blank 54 facing the lens mounting face 64 of the lens block 62; and
  (f) generating UV or visible light and transmitting the light to the adhesive composition 78, the light being of a wavelength and an intensity and applied for a time interval sufficient to cause setting of the adhesive composition 78.

As compared with FIG. 11 illustrating the prior art, FIG. 7 shows the same lens blanks 54 as those of FIG. 11 in terms of blocking face curvature (a) 0.5 diopters, b) 2 diopters, c) 6 diopters, and d) 10 diopters), however now blocked on only one block curve of 5 diopters in this instance. This helps illustrate the issues associated with a reduced number of block curves, and why the proposed solution is felt to be advantageous.

In FIG. 7 it first appears as though the usage of blocking material will be considerably greater than that seen to be used in FIG. 11. The amount of blocking material used is however not as great as one would initially think, given the reason that the single block curve can be chosen to best fit the majority of spectacle lenses in a statistical distribution of lens base curves.

Figure 9:
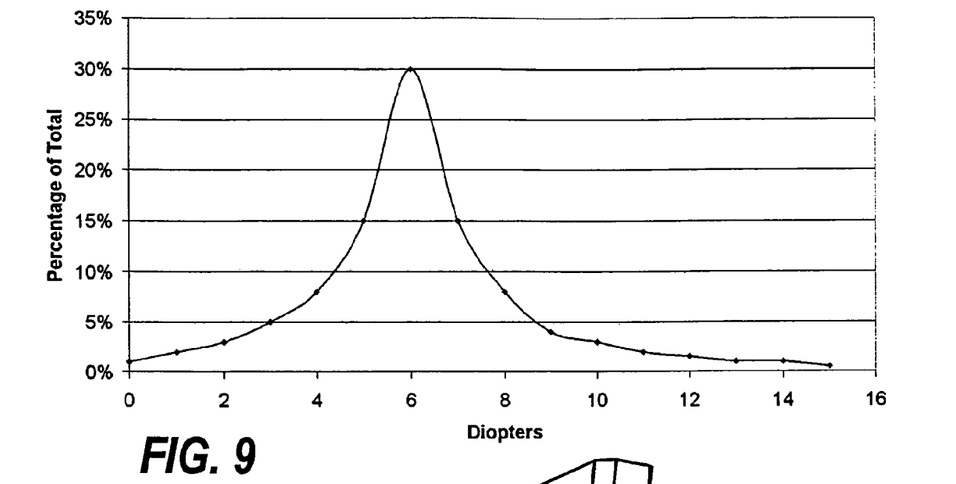
FIG. 9 is a diagram illustrating a typical distribution of ophthalmic lens front curves for a given population.

In this connection FIG. 9 illustrates a typical base (front) curve distribution for a given population. Because of this distribution, and also considering proper selection of an optimal block curve, the blocking material usage is only increased by 10 to 15% when using one block curve compared to 7 block curves. If two block curves are used, then the increase in blocking material usage is calculated at only 6% more than with 7 block curves. This marginal increase in blocking material consumption is easily compensated by the cost reduction associated with managing only one or two block curves versus the high number of curves typically encountered.

One of the issues raised when using a low number of block curves becomes clear from FIGS. 7a), b), and d). This is the issue of uneven shrinkage associated with the non-constant blocking material thickness. Shrinkage is mainly caused by the polymerization of the UV/VIS curable adhesive, but can also come from thermal effects when this material is cured.

Depending on what type of chemistry is used, and what temperatures are reached during curing it is possible to see material shrinkage ranging between 2 to 10% or even more. High temperatures can come from energy of the curing radiation, but also from the exothermic heat generation caused by the chemical reaction during polymerization. Temperatures ranging between 10 and 40° C. above the initial room temperature can easily be reached; and when the block assembly cools back down to room temperature it will shrink according to the different CTEs (Coefficients of Thermal Expansion) and mechanical properties of the final assembly. This shrinkage will be internally constrained and can cause unwanted mechanical (thermal) stresses in the final assembly.

Although shrinkage is a three dimensional effect, the amount of axial shrinkage at a given point is generally considered to be proportional to the thickness of the UV/VIS curable adhesive at that point. One can clearly see that this, given sufficient shrinkage, would result in a change of blocking material geometry. This change can have two undesired effects: The first is de-bonding of the lens blank from the blocking material caused by the blocking material "pulling away" from the lens blank. In FIG. 7a) de-bonding would tend to happen more at the center of the lens blank 54, whereas in FIG. 7d) one would see this more at the edge. The worst situation in this case is seen in FIG. 7a), where any de-bonding at the center could cause unacceptable distortion at the center due to lack of support of the lens blank 54 during surfacing. In addition to this, even if no de-bonding is present, because of the final thin center lens geometry, shrinkage at the center would tend to modify the final curvature at the center, thereby introducing power errors. The case seen in FIG. 7d) is much less critical related to power errors since the center of the lens is expected to stay relatively thick (positive power) therefore of high rigidity, and able to better withstand stresses coming from shrinkage.

To address among other things the above issues a specially selected filler(s) as a non polymerizing solid is added to the UV/VIS curable blocking material as will be explained in more detail below.

Figure 8:
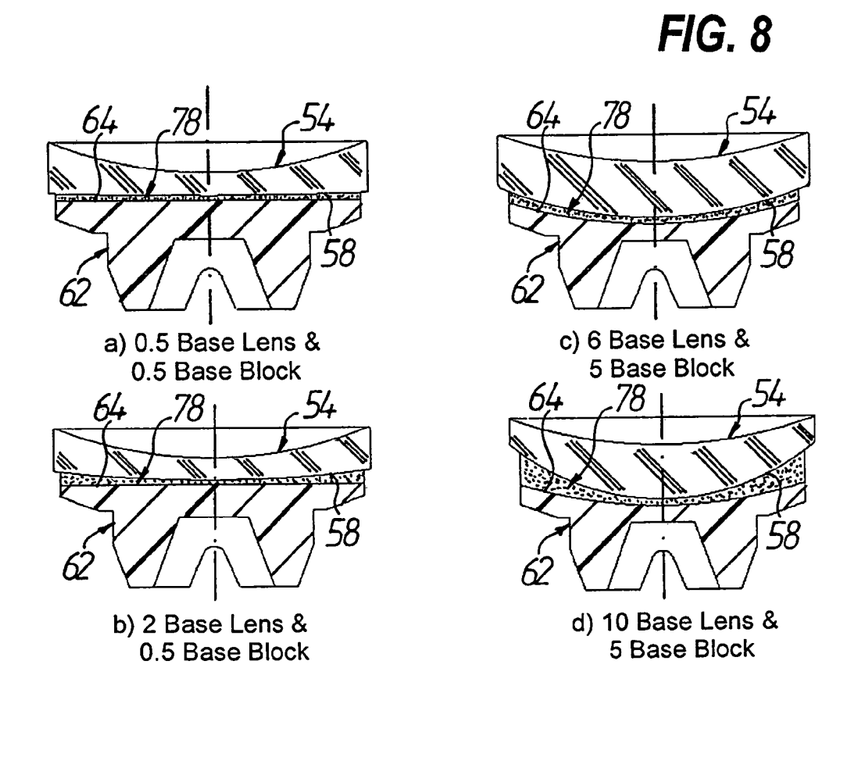
FIG. 8 shows, by way of sectional views, four lens blanks each having a blocking face of different pre-determined curvature, that were blocked using a second method according to the invention in which lens blocks with two different block curves only and an adhesive composition comprising in an un-polymerized state a liquid UV/VIS curable adhesive and a filler as a non polymerizing solid are utilized.

Turning now to FIG. 8 it illustrates blocking results obtained by a further blocking process that comprises the following steps:
  (a) providing a plurality of lens blocks 62 each comprising a lens mounting face 64 that has a pre-determined block curve, wherein the lens blocks 62 have a few different block curves only—in this instance, again, the lens blocks 62 all have an essentially spherical lens mounting face 64, and there are provided lens blocks 62 of two different block curves only, namely lens blocks 62 comprising a concave block curve of 0.5 diopters (FIGS. 8a) and b)), and lens blocks 62 comprising a concave block curve of 5 diopters (FIGS. 8c) and d)); and
  (b) selecting a lens block 62 having a specific block curve depending on the curvature of the blocking face 58 of the lens blank 54 so that the block curve matches the curvature of the blocking face 58 as best as possible—in the example shown this step was carried out to the effect that, in the blocked state of the lens blank 54, a gap between the lens mounting face 64 of the lens block 62 and the blocking face 58 of the lens blank 54 is minimized in a central region of the lens block 62 in order to minimize or even suppress the induction of stresses into the blocked lens blank 54; so the 0.5 base lens blocks 62 were assigned to the 0.5 and 2 base lens blanks 54 (FIGS. 8a) and b)), whereas the 5 base lens blocks 62 were assigned to the 6 and 10 base lens blanks 54 (FIGS. 8c) and d)).

The remaining steps in this process alternative are the same as steps (c) to (f) discussed above in connection with FIG. 7.

As to the material requirements which should be met by the adhesive composition 78 comprising the adhesive curable by UV or visible light that is liquid in the un-polymerized state, and the filler as a non polymerizing solid, the following is to be noted.

Generally it is desirable to achieve certain mechanical and thermal properties in the cured material. These properties are such that good lens support is achieved, while maintaining or even enhancing the ability to deblock the lens upon demand. In this context "deblocking" means to release the adhesive bond between lens and adhesive composition through chemical, thermal, mechanical or some other means or any practical combination thereof.

Multifunctional fillers or special combinations of fillers can be used to either maintain or modify the material properties while simultaneously reducing shrinkage, exothermic heat of reaction, and cost. Another potential function of the filler is to modify the adhesive properties under certain controlled conditions to permit easier deblocking.

The cured material typically needs to be sufficiently rigid to prevent flexing and movement of the lens or the area of the lens in the immediate vicinity of the cutting tool during the machining process. Having a flexible blocking material however makes it easier to "peel" this material off the lens during the deblocking process. A hard and brittle material is difficult to peel off, and tends to break into smaller pieces, whereas a soft pliable and cohesive material will more easily peel off in one piece.

If mechanical peeling is chosen over other deblocking methods, the preferred material will have either a rigidity level sufficiently high to allow surfacing while being sufficiently low for deblocking, or it could be subjected to a "softening" process prior to deblocking. This "softening" process could for example be heating of the blocking material by immersion in warm water, or exposure to other forms and/or wavelengths of radiation such as IR or microwaves. In this case the adhesive composition should be designed to better support deblocking with certain modifiable properties such as reduction in hardness, possibly also combined with reduction in adhesiveness.

A small amount of metal fibers, granules, or powder can be added to the filler to enhance heating of the cured blocking material in microwave energy. A small quantity (1 or 2% by weight of the composition in total) of fine aluminum fibers mixed with the liquid adhesive are not enough to prevent curing since the UV radiation can still easily penetrate the adhesive, but yet provides sufficient absorption of microwave energy to significantly accelerate heating of the material. A microwave exposure time of 15 seconds is all that is needed to raise the material temperature from 30° C. by 25° as compared to 20 seconds without the aluminum fibers.

Other possibilities for accelerated heating of the cured blocking material to facilitate deblocking by "softening" the cured blocking material would be to add a small percentage (1 to 5% by weight of the filler in total) of metal particles having generally high electrical resistance, and use induction heating elements to induce electrical currents into the particles. The electrical resistance to current flow in turn generates heat in the particles, which then transmits to the surrounding material, thus heating the blocking compound. Other non-metallic, yet conductive materials such as carbon, and certain semi-conductive particles could also be used with induction heating technology.

One example of a multifunctional filler material that can be used to maintain or improve hardness and rigidity at normal surfacing process temperatures, yet enhance the flexibility during deblocking is e-Caprolactone and its derivative Polycaprolactone. E-Caprolactone, and its derivative Polycaprolactone is a thermoplastic monomer and is sufficiently translucent to allow UV and/or visible light transmission, and therefore allow curing of a matrix of liquid UV adhesive and Polycaprolactone particles as a non-polymerizing solid filler. Fill ratios as high as 65% by weight of Polycaprolactone were successfully cured and tested for hardness and adhesion to the lens blank and lens block. At room temperature this material can be selected to be quite hard (e.g., between 50 and 70 Shore D), then, after surfacing, the cured blocking material can be heated and allowed to reach a point where the Polycaprolactone particles are soft (e.g., between 10 and 40 shore D) however not liquid. These temperatures are sufficiently low (between 35° and 60° C. for instance) so as to not damage the lens. The UV/VIS cured adhesive component in the matrix stays solid, but the Polycaprolactone particles, being significantly softer at these temperatures, cause the whole matrix to be softer, and thus considerably improve the ease of removal of the blocking material from the lens. Polycaprolactone has a relatively low Glass Transition Temperature (Tg) so all processing would be done at higher than Tg in this case. Other materials similar to Polycaprolactone can also be identified.

Another variation is to use a filler material with a Tg above surfacing process temperatures (typically close to room temperature), yet lower than temperatures that could permanently damage a surfaced lens (80° C.). The MatWeb database (www.matweb.com) has listed 235 polymer materials with a Tg between 25° and 80° C. These can be used to achieve certain mechanical properties at process temperatures (e.g., high stiffness and hardness), then change these mechanical properties by raising the temperature above Tg. One such material of interest is ExxonMobil "Escor AT320 EMA-AA Terpolymer". This is an Ethyl-Methyl-Acrylate-Acrylic Acid. It is solid at room temperature and can be mixed in solid particle form with the liquid UV/VIS curable adhesive material. It provides an excellent surface for bonding to acrylate based UV/VIS curable adhesive materials since it is itself acrylate based.

Another material family that has been shown to have many desirable functionalities as fillers for this application is that marketed by Lucite International Specialty Polymers Ltd., under the trade name of "ELVACITE®". These materials can for example be High Methacrylate Resins, Ethyl Methacrylate Resins, Methacrylate Copolymer Resins, or Butyl Methacrylate Resins. Their properties range from low to very high molecular weights, and Tukon hardness between 1 and 20 (Knoop No.), and Tg between 15° C. and 110° C. One of these materials that has proven effective for this application is "ELVACITE® 2550" (Methyl/n-Butyl methacrylate copolymer) with a Tg of 36° C. It is relatively soft with Knoop hardness number of 4 but capable, if used with rather high fill percentages (60% to 70%), to ensure sufficient stiffness for surfacing, while facilitating deblocking due to the relatively low hardness and particular thermal properties. An added benefit to these products is that they can be directly purchased in a small diameter spherical bead form. The typical bead diameters are between 10 to 200 microns, which makes them directly usable without pre-processing to grind larger pellets down to an acceptable size.

Filler should also be non abrasive, and non destructive to cutter tools. If one cuts through the cured blocking material with a cutting or grinding tool it should not damage the tool. Some increased wear can be acceptable in certain circumstances however the amount of increased wear tolerated by the customer is typically driven by total process economics.

The preferred filler particle geometry (generally spherical) and size (smaller than 2 mm, more preferably equal to or less than 1 mm) have been discussed already. Another important property of the filler is that it must not prevent or unduly slow down the curing process by blocking or somehow inhibiting the UV and/or visible electromagnetic energy from reaching the photoinitiators imbedded in the UV/VIS curable adhesive material. Thus transparency and/or translucency to the photo active wavelengths is considered very important for the selection of a compatible filler.

A still further desirable feature or function of the filler material is to reduce outgassing by incorporating a very low outgassing material(s), and thus significantly reduce the "vacuum pumping times" if and when a complete blocked lens is introduced into a vacuum chamber typically used in thin film coating processes. Three major sources of outgassing can be VOC emissions (Volatile Organic Compounds) from solvents, uncured remainders of liquid resin, and water moisture trapped within the blocking material. All three of these materials can vaporize in a vacuum and create a situation where it is difficult or slower than desired to reach the level of vacuum required for the coating process.

In the case of solvents the preferred approach is to avoid introducing any solvents in the liquid compound. This means it is generally preferred to use 100% solids type resins to guarantee no solvent stays in absorption in the cured blocking material. Incomplete cure can be a cause for the liquid resin remaining within the "cured" material. This problem is generally addressed by again providing a UV/VIS transparent/translucent filler, and providing better curing technology, such as a better focussed high powered light source to scan the lens block, or ultra high energy XENON flash lamp technology. The third situation is that of moisture content. In this case it becomes important to choose low moisture absorption material(s) for the filler. Examples of such materials are polycarbonate and PET based materials just to name two.

Finally, a strongly preferred approach is to directly re-use the UV/VIS cured adhesive material in a reground state as a filler. What is proposed is that as lenses are deblocked, instead of discarding the cured UV blocking material, the operator can simply put it into a small grinder designed to regrind the material to the proper particle size. This reground material is then mixed with new uncured UV/VIS curable adhesive material in the proper mixing ratio using known measuring technology and apparatus and methods. Metering screws using a mixing nozzle is one approach. The preferred mixing ratios are between 40%/60% and 70%/30% filler granulate vs. liquid UV/VIS curable adhesive material. This concept allows continuous or on demand mixing of the two components in relatively accurate mixing ratios, and can also be used to deliver the correct amount of mixed adhesive composition to the lens block. Another simpler approach is to simply weigh the correct amount of components for a batch, and mix with a powered hand mixer such as a hand drill assisted paint mixer.

One of the main advantages to using reground material is that all the shrinkage and exothermic heat reduction are obtained that would normally be expected with other fillers, while simultaneously reducing cost even more than if these other fillers were used. The cured blocking material would normally end up in disposal, so recycling 50% to 70% of it has both economic and environmental benefits. Cost benefits are realized since its cost is near zero. The only costs are those of handling, grinding, and mixing. Environmental benefits come from the fact that the disposal volumes are significantly reduced. Another advantage is that new uncured material bonds very well to the cured material due to chemical similarity between the two. Still another benefit is that any variation in mixing ratios will not affect the final mechanical and thermal properties such as temperature dependent hardness/flexibility, softening point, etc. This simplifies mixing and quality control of the mixed adhesive composition since tolerances to mixing errors are much greater. Other advantages are those of consistent and predictable UV transmissibility, "all in one" compound design not affected by foreign or not completely compatible fillers, no filler quality variation, etc.

It is to be noted here that the last two paragraphs assume using "pure" uncured and unfilled UV/VIS curable adhesive material to start with, then after this material has been cured it is ground and used as a filler with new liquid (uncured) material. From this point forward, when a lens is deblocked, the UV/VIS cured blocking material is recycled by grinding and mixed as a non polymerizing solid filler into new uncured UV/VIS curable material.

Example 1

A mixture of 60% by weight Solvay "Polycaprolactone C6500" with a particle size of 3 mm, and 40% by weight "General #3" UV curable blocking compound (PL110284-02, MFG. DATE: Jan. 23, 2006-01) containing acrylate resins, monomers and photoinitiators, and sold by MotionFab (609891 NB Ltd.) of Moncton, New Brunswick, Canada was tested. (The General #3 blocking compound was formerly known as "ULTRAGRIP®" sold by Micro Optics Design Corporation of Moncton, New Brunswick, Canada). As in the following examples the individual components of the adhesive composition, i.e. the liquid UV curable adhesive and the solid filler particles were mixed thoroughly by hand.

The mixed product cured successfully due to the fact that the "white" C6500 particles transmitted enough of the photo active wavelengths to obtain complete curing after 10 seconds of exposure time using a "Fusion" UV lamp (which can be obtained from Fusion UV Systems, Inc. 910 Clopper Road Gaithersburg, Md. 20878-1357 USA) mounted with a "D" type bulb.

The main disadvantages to this material seemed to be the large particle size, and the relatively high cost of the C6500. The hardness at room temperature of the mixed and cured sample was measured to be in the range of 39 to 55 Shore D which very closely matches the hardness of cured General #3 (38 Shore D) and C6500 measured at 57 Shore D. A multiple reading average gave a value of 45.6 Shore D. The reason for the large variance and close correlation to the hardness's of each component has been attributed to the large particle size and the probability of measuring with the gage point directly over a C6500 particle, or in between particles. Also, the C6500 particles were covered by a non uniform thickness of General #3, which further added to the unpredictability of the measurements.

A softening of the cured adhesive composition measured as a reduction in average hardness to 35 shore D at a deblocking temperature of 50° C. was however clearly seen, and facilitated deblocking.

The large particle size of the C6500 was seen to be a problem for two major reasons; the first was that this increases the minimum gap achievable between the lens blank and the lens block, therefore increasing the quantity of material needed for blocking. The second problem was seen to be irregular shrinkage causing a small ripples or variation in optical power in very thin lenses. This is explained by shrinkage between granules being greater than the shrinkage directly over a granule, with another possible contributing factor being the variance in hardness causing a variation in support stiffness provided by the cured blocking material.

Example 2

A mixture of "Elvacite® 2550" (Methyl/n-Butyl methacrylate copolymer) obtained from Lucite International Specialty Polymers Ltd. and General #3 was prepared at a ratio of 60% by weight Elvacite® 2550 to 40% by weight UV compound, i.e. General #3. This increased the overall hardness of the cured adhesive composition to 40.4 Shore D, and resulted to a much lower variance in hardness.

The particular sample of Elvacite® 2550 used had generally spherical or ellipsoidal particles of irregular diameters ranging from 15 to 460 microns, with an average particle size of 350 microns.

The low Tg (36° C.) and relatively low hardness of 28 Shore D of the cured mixture at 50° C. deblocking temperature gave a good combination of stiffness at processing (surfacing) temperatures and high flexibility at deblocking temperatures. The 350 micron particle size was also seen to be a benefit for providing uniform shrinkage and support in addition to minimum gaps of less than 0.5 mm being possible. And finally the UV transparent/translucent properties of the Elvacite® 2550 filler made it very easy to cure the adhesive composition with all the different light sources that were tested.

Example 3

A third compound was prepared using ExxonMobil "Escor AT320 EMA-AA Terpolymer". The 60% by weight of Escor AT320 filler to 40% by weight of General #3 was again used.

The particle geometry of this filler was irregular, and the particle size was such that it passed through a 1.5 mm screen.

This adhesive composition is seen to be an advantageous material from the thermal properties perspective, and was tested for support at a surface processing temperature of 23° C. and deblocking temperature between 55° C. and 60° C. Hardness reduced on a slope of 0.4 Shore D per ° C., but started at a relatively low 25 Shore D hardness at 25° C. This hardness is lower than the General #3 hardness of 38 Shore D so it is felt that other products from this filler material family may provide better stiffness at surface processing temperatures between 20 and 25° C.

Example 4

A fourth compound was prepared and tested using a filler made from cured, i.e. polymerized pure General #3 at 50% by weight and liquid (uncured) General #3 at 50% by weight. In this instance the final cured adhesive composition is always General #3 since the filler is also the same General #3.

The cured material was ground to have particle sizes between 0.5 and 1.5 mm, and an average size of 1 mm. These particles were very irregular in shape due to the grinding process used. Higher fill ratios were difficult to obtain, possibly due to the irregular particle geometries.

This material had all of the advantages of other filled materials tested; namely lower shrinkage, and lower exothermic heat of polymerization. In the polymerized state, i.e. as a non polymerizing solid filler it is UV transparent and forms a very coherent solid mass of material with identical mechanical and thermal properties to that of the unfilled material. Major advantages of this approach to recycling the blocking material itself are those of low cost and of reduced material wastage.

Example 5

A fifth blocking material was prepared from the uncured adhesive composition according to EXAMPLE 4 above by adding 2% by weight of the filler in total of small aluminum fibers ("Aluminiumfasern Al Mg S Kurzfaser F35") purchased from Alroko GmbH & Co. KG, of Hamburg, Germany.

The fibers were very irregular in size and shape. They ranged in length from 0.5 mm to 3 mm, and varied in diameter from 0.1 to 0.5 mm.

The purpose of the added fibers was simply to shorten the heating time using microwave energy. This proved to be very effective for this purpose.

A new lens blocking material (adhesive composition) is proposed that essentially overcomes the drawbacks of previous blocking materials. This new material combines traditional UV and/or visible light (VIS) curable polymer materials with specially selected filler(s) as a non polymerizing solid in order to achieve or improve certain desirable material properties, including those of low shrinkage, low exothermic heat of polymerization, and improving the ability to deblock, while simultaneously reducing the high cost associated with such UV/VIS radiation curable materials. The new material is being used in methods for blocking a lens blank onto a lens block with a lens mounting face that has a pre-determined block curve, in which the number of different block curves required to cover the full range of standard lenses is minimized.

LIST OF REFERENCE NUMERALS 10 lens blank
12 step discontinuity
14 bifocal segment
16 base curve
18 lens block
20 UV cured adhesive
22 gap
24 gap
26 lens mounting face
28 blocking face
30 blocking apparatus
32 top
34 hood structure
36 lens transporter
38 first linear actuator
40 imaging station
42 probing station
44 lens blocking station
46 camera
48 adhesive composition reservoir
50 pumping unit
52 central processing unit
54 lens blank
56 screen
58 blocking face
60 lens block support
62 lens block
64 lens mounting face
66 UV light source
68 aperture
70 dispenser
72 dispenser nozzle
74 dispenser arm
76 motor
78 adhesive composition

The invention claimed is:

1. A method for blocking a lens blank having a blocking face of pre-determined curvature, said method comprising the steps of:
   (a) providing a plurality of lens blocks each comprising a lens mounting face that has a pre-determined block curve, wherein said lens blocks all have the same block curve;
   (b) taking out one of said lens blocks of said plurality of lens blocks;
   (c) mixing an adhesive composition comprising in an unpolymerized state a liquid adhesive curable by UV or visible light and a filler as a non polymerizing solid;
   (d) applying to at least one of said blocking face of said lens blank and said lens mounting face of said lens block said adhesive composition;
   (e) urging said lens blank toward said lens block with said blocking face of said lens blank facing said lens mounting face of said lens block;
   (f) generating UV or visible light and transmitting the light to said adhesive composition, said light being of a wavelength and an intensity and applied for a time interval sufficient to cause setting of said adhesive composition;
   (g) wherein said filler substantially comprises solid particles having a particle size that is equal to or less than 1 mm and wherein a mixing ratio of said adhesive and said filler is selected to have a dimensional change and exothermic heat of polymerization of said adhesive composition upon setting low enough so that the adhesive composition is capable of setting without imparting undue stresses on said lens blank and without de-bonding of said lens blank from said adhesive composition; and
   (h) wherein said filler is a plastic material wherein the plastic material is Polycaprolactone, Terpolymer derived from Ethyl-Methyl-Acrylate-Acrylic Acid, or the filler is UV or visible light cured adhesive in a reground state.

2. The method according to claim 1, wherein said lens blocks all have an essentially spherical lens mounting face comprising the same block curve selected in accordance with a distribution of said blocking face curvature of lens blanks to be blocked for a given population.

3. A method for blocking a lens blank having a blocking face of pre-determined curvature, said method comprising the steps of:
   (a) providing a plurality of lens blocks each comprising a lens mounting face that has a pre-determined block curve, wherein said lens blocks have eight or less different block curves only;
   (b) selecting a lens block having a specific block curve depending on said curvature of said blocking face of said lens blank so that said block curve matches said curvature of said blocking face as best as possible;
   (c) mixing an adhesive composition comprising in an unpolymerized state a liquid adhesive curable by UV or visible light and a filler as a non polymerizing solid;
   (d) applying to at least one of said blocking face of said lens blank and said lens mounting face of said lens block said adhesive composition;
   (e) urging said lens blank toward said lens block with said blocking face of said lens blank facing said lens mounting face of said lens block;
   (f) generating UV or visible light and transmitting the light to said adhesive composition, said light being of a wavelength and an intensity and applied for a time interval sufficient to cause setting of said adhesive composition;
   (g) wherein said filler substantially comprises solid particles having a particle size that is equal to or less than 1 mm and wherein a mixing ratio of said adhesive and said filler is selected to have a dimensional change and exothermic heat of polymerization of said adhesive composition upon setting low enough so that the adhesive composition is capable of setting without imparting undue stresses on said lens blank and without de-bonding of said lens blank from said adhesive composition; and (h) wherein said filler is a plastic material wherein the plastic material is Polycaprolactone, Terpolymer derived from Ethyl-Methyl-Acrylate-Acrylic Acid, or the filler is UV or visible light cured adhesive in a reground state.

4. The method according to claim 3, wherein said lens blocks all have an essentially spherical lens mounting face, there being provided lens blocks of two different block curves only, namely lens blocks comprising a concave block curve within the range of 0 to 4 diopters, and lens blocks comprising a concave block curve within the range of 4 to 8 diopters.

5. The method according to claim 3, wherein said step of selecting a lens block is carried out to the effect that, in the blocked state of said lens blank, a gap between said lens mounting face of said lens block and said blocking face of said lens blank is minimized in a central region of said lens block.

6. The method according to claim 3, wherein said lens block is capable of transmitting UV or visible light, and wherein said step of generating UV or visible light and transmitting the light to said adhesive composition includes transmitting the light to said adhesive composition through said lens block.

7. The method according to claim 3, wherein the mixing ratio of said adhesive and said filler is in a range from 70%/30% to 30%/70% by weight adhesive vs. filler.

8. The method according the claim 7, wherein the filler contains a small amount of metal fibers, granules, or powder in a quantity of 1 to 2% by weight of the composition in total.

9. A method for blocking a lens blank having a blocking face of pre-determined curvature, said method comprising the steps of:

(a) providing a plurality of lens blocks each comprising a lens mounting face that has a pre-determined block curve, wherein said lens blocks have eight or less different block curves only;

(b) selecting a lens block having a specific block curve depending on said curvature of said blocking face of said lens blank so that said block curve matches said curvature of said blocking face as best as possible;

(c) mixing an adhesive composition comprising in an un-polymerized state a liquid adhesive curable by UV or visible light and a filler as a non polymerizing solid;

(d) applying to at least one of said blocking face of said lens blank and said lens mounting face of said lens block said adhesive composition;

(e) urging said lens blank toward said lens block with said blocking face of said lens blank facing said lens mounting face of said lens block;

(f) generating UV or visible light and transmitting the light to said adhesive composition, said light being of a wavelength and an intensity and applied for a time interval sufficient to cause setting of said adhesive composition;

(g) wherein said filler substantially comprises solid particles having a particle size that is equal to or less than 1 mm and wherein a mixing ratio of said adhesive and said filler is selected to have a dimensional change and exothermic heat of polymerization of said adhesive composition upon setting low enough so that the adhesive composition is capable of setting without imparting undue stresses on said lens blank and without de-bonding of said lens blank from said adhesive composition;

wherein said step of selecting a lens block is carried out to the effect that, in the blocked state of said lens blank, a gap between said lens mounting face of said lens block and said blocking face of said lens blank is minimized in a central region of said lens block; and wherein said filler is a plastic material wherein the plastic material is Polycaprolactone, Terpolymer derived from Ethyl-Methyl-Acrylate-Acrylic Acid, or the filler is UV or visible light cured adhesive in a reground state.

10. The method according to claim 9, wherein said lens blocks are capable of transmitting UV or visible light, and wherein said step of generating UV or visible light and transmitting the light to said adhesive composition includes transmitting the light to said adhesive composition through said lens block.

11. The method according the claim 9, wherein the filler is substantially transparent and/or translucent to photo active wavelengths of UV and/or visible light.

12. A method for blocking a lens blank onto a lens block using an adhesive composition, said method comprising:

adding an adhesive curable by UV or visible light that is liquid in an un-polymerized state between said lens blank and said lens block;

adding a filler to said adhesive as a non-polymerizing solid, wherein said filler consists of solid particles having a particle size that is equal to or less than 1 mm and is transparent or translucent to photoactive wave length of UV and/or visible light;

wherein said filler is a plastic material wherein the plastic material is Polycaprolactone, Terpolymer derived from Ethyl-Methyl-Acrylate-Acrylic Acid, or the filler is UV or visible light cured adhesive in a reground state; and positioning said lens blank on said lens block with said adhesive and filler filling any gap therebetween; and curing said adhesive.

13. The method according to claim 12, wherein the mixing ratio of said adhesive and said filler is in a range from 70%/30% to 30%/70% by weight adhesive vs. filler.

14. The method according to claim 13, wherein the filler contains a small amount of metal fibers, granules, or powder in a quantity of 1 to 2% by weight of the composition in total.

* * * * *